United States Patent [19]

Kalnins

[11] Patent Number: 5,093,006

[45] Date of Patent: Mar. 3, 1992

[54] LIQUID SEPARATOR

[75] Inventor: Charles M. Kalnins, The Woodlands, Tex.

[73] Assignee: Conoco Specialty Products Inc., Houston, Tex.

[21] Appl. No.: 449,833

[22] PCT Filed: Jun. 10, 1988

[86] PCT No.: PCT/AU88/00186

§ 371 Date: Dec. 8, 1989

§ 102(e) Date: Dec. 8, 1989

[87] PCT Pub. No.: WO88/09698

PCT Pub. Date: Dec. 15, 1988

[30] Foreign Application Priority Data

Jun. 10, 1987 [AU] Australia ................. PI2390
Dec. 24, 1987 [AU] Australia ................. PI6102

[51] Int. Cl.$^5$ ........................................... B01D 17/038
[52] U.S. Cl. ..................................... 210/704; 210/182;
210/202; 210/257.2; 210/259; 210/323.1;
210/500.1; 210/500.21; 210/502.1; 210/512.1;
210/513; 210/708; 210/737; 210/738; 210/787;
210/799; 210/804; 210/806; 210/008;
210/DIG. 5
[58] Field of Search ............. 209/211; 210/513, 512.1,
210/259, 321.6, 703, 704, 776, 787, 788, 804,
801, 806, 484, 175, 177, 295, 737, 198.1, 702,
738, 787, 788; 166/267

[56] References Cited

U.S. PATENT DOCUMENTS

| 3,576,738 | 4/1971 | Duffy | 210/704 |
| 3,946,101 | 3/1976 | Harendza-Harinxma | 55/528 |
| 4,161,428 | 7/1979 | Gottschlich et al. | 196/14.52 |
| 4,226,722 | 10/1980 | Jones | 210/484 |
| 4,482,459 | 11/1984 | Shiver | 210/776 |
| 4,539,097 | 9/1985 | Kelterborn et al. | 210/193 |
| 4,935,154 | 6/1990 | Arnold | 210/787 |

FOREIGN PATENT DOCUMENTS

| 854884 | 8/1981 | U.S.S.R. | 210/787 |
| 1280598 | 3/1970 | United Kingdom | 210/299 |
| 1252228 | 7/1971 | United Kingdom | 55/350 |

OTHER PUBLICATIONS

Webster's II New Riverside University Dictionary, p. 478, Houghton Mifflin Company, copyright 1984.

Primary Examiner—Robert A. Dawson
Assistant Examiner—Joseph Drodge
Attorney, Agent, or Firm—John E. Holder

[57] ABSTRACT

Liquid separator and method of separating oil and water components of a liquid mixture wherein the oil component is made up of droplets of a less dense phase in a more dense water phase, using a hydrocyclone for separating the components. A less dense component of the mixture separated by the hydrocyclone is passed from the underflow of the hydrocyclone to a filter device for further separation. A residence vessel may be provided upstream of the hydrocyclone for coalescing the mixture prior to passage into the hydrocyclone.

17 Claims, 3 Drawing Sheets

FIG·2

LIQUID SEPARATOR

This invention relates to a liquid separator.

The invention generally envisages the use of a hydrocyclone to pre-condition a mixture before admission to a filter device, such as an activated charcoal reverse osmosis filter device.

In one aspect, there is provided a liquid separator comprising a hydrocyclone having a separating chamber with an inlet for inlet of mixture to be separated, an overflow outlet for outlet of a less dense component of the mixture and an underflow outlet for outlet of a more dense component of said mixture, and a filter device coupled to receive outlet from said underflow outlet. The hydrocyclone is in this case effective in use to effect a pressure reduction in the material emerging from said underflow outlet, as compared to pressure of said mixture at said inlet, whereby to facilitate any of said less dense component present in solution in said more dense component breaking out of solution to be either carried to said overflow outlet or to emerge from the underflow outlet with the more dense component, as droplets thereof in the more dense component, the filter device effecting further separation of said droplets from the more dense component.

The mixture to be separated may be passed to a mixing and/or residence vessel, such as a coalescer or precoalescer, for example a cross plate interceptor skimmer before passage to the hydrocyclone. In such case, provision may be made for injection of heated fluid, such as water, to the vessel, such as periodically.

The invention also provides a method for separating components of a liquid mixture one from the other by use of hydrocyclone to which the mixture is admitted, the hydrocyclone being operated whereby a less dense component of the mixture emerges from an outlet of the hydrocyclone in the form of droplets in a more dense component of the mixture, the material emerging from the outlet being admitted to a filter device to effect further separation thereof.

The invention is further described by way of example only with reference to the accompanying drawings in which:

FIG. 2 is a diagram showing a hydrocyclone used in the apparatus of FIG. 1; and.

Figure 1:
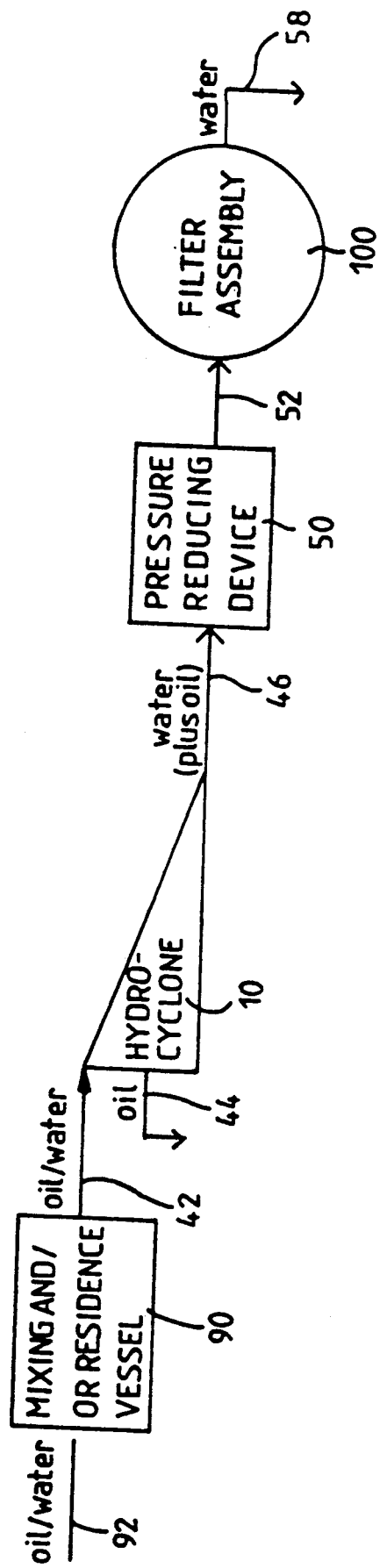
FIG. 1 is a flow diagram of a liquid separator constructed in accordance with the invention.

The liquid separator shown in FIG. 1 comprises a mixing and/or residence vessel 90 to which a mixture of oil in water is admitted such as on the line 92 shown. The mixture is then taken on line 42 to a hydrocyclone 10 to provide at an outlet line 44 separated oil and at an outlet line 46 separated water which may, however, still contain some residual oil. The water component is passed on line 46 through a pressure reducing device 50 and thence on a line 52 to a filter device 100. Here, further separation occurs with the water component being taken on a line 58 from the device 100.

Figure 2:
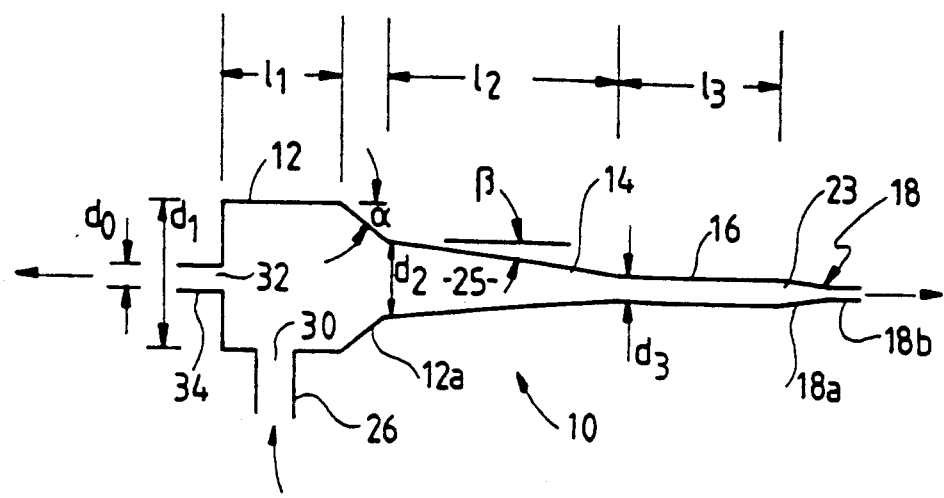

The hydrocyclone 10 may be constructed in known fashion, such as in accordance with the teachings of U.S. Pat. No. 4,237,006, Australian patent application 84713/79, or in my International applications PCT/AU83/00028 or PCT/AU85/00010. FIG. 2 shows, diagrammatically, a separator of this general type. This is shown as having a tapered elongate separating chamber 25 which is of circular cross-section having, at its larger diameter end, a first cylindrical portion 12, a tangential inlet 26 having an inlet opening 30, and an axial overflow outlet 34 which communicates with an outlet opening 32. A tapered portion 12a of separating chamber 25 is provided adjacent portion 12, this leading to a second, also slightly tapered, portion 14 of the separating chamber 25, this in turn leading to an elongate cylindrical portion 16 of the separating chamber which opens to an axial underflow outlet 23 for the separator.

Oily water mixture to be separated is passed on the inlet 26 through the inlet opening 30 into the portion 12 of the separating chamber 25 so as to generate a vortex within the separating chamber. The oil component emerges from the outlet 34 via opening 32 and the water component emerges from the underflow outlet 23.

As shown, the first portion 12 has a length $l_1$ and a diameter $d_1$, the second portion has a length $l_2$ and diameter $d_2$ at its larger diameter end, portion 16 has a length $l_3$ and a diameter $d_3$, whilst the overflow outlet has a diameter $d_0$. As described in Australian patent application 84713/79, two or more strictly tangential inlets 26 may for example be provided or, as shown in International application PCT/AU85/00010, a single inlet 26 of involute form may be provided.

In accordance with the above described construction, the cyclone separator may be constructed in accordance with any one or more or all of the following dimensional constraints.

$$l_2/d_2 > 10, \text{ such as } 10 < l_2/d_2 < 25$$

$$3 \leq \frac{\pi d_i d_2}{4A_i} \leq 30$$

such as $$3 \leq \frac{\pi d_i d_2}{4A_i} \leq 20$$

$$d_0/d_2 \leq 0.25, \text{ such as } d_0/d_2 \leq 0.1$$

$$d_1 > d_2$$

$$d_2 > d_3$$

where $A_i$ is the total inlet area of all of the inlet openings combined or the inlet opening if there is only one. $\beta$, the half angle of the taper of the second portion, may be 20' to 2°, such as 1°. Portion 12a is optional. If provided, it may have a half angle, $\alpha$, of 10°.

Other suitable constructions for hydrocyclone 10 are shown, for example, in the specification of Australian patent application 77610/87 and of International applications PCT/AU87/00402, PCT/AU86/00313, PCT/AU86/00173 and PCT/AU85/00181.

In the construction shown in FIG. 2, the overflow outlet 23 communicates with a fourth portion 18 of the separator, which has the effect of providing a back pressure to facilitate the separating action. Such a fourth portion is described in International application PCT/AU83/00028 and may, as shown, comprise a first frustoconical portion 18a which leads from outlet 23 followed by a second cylindrical portion 18b. When used in the apparatus of FIG. 1, this arrangement provides a pressure reducing action and permits omission of the pressure reducing device 50, line 46 in that case communicating directly with line 52 to admit material from the separator 10 directly to the filter device 100.

The hydrocyclone 10 acts, as described, to effect removal of an oil component from an oily-water mixture when admitted thereto. Generally, the separator 10 is designed for use where there is a substantially smaller amount of oil than water in the incoming mixture. However, the concentration of oil may be of the order of several percent for example.

After admission through vessel 90, the hydrocyclone 10 is able to reduce the oil concentration to a quite low level in the water component which emerges from the outlet thereof, such as below 500 ppm. Then, after passage through the pressure reducing device 50 or through the portion 18 of the described hydrocyclone, the oily water as then passed to the filter device 100 is further separated to reduce the oil component to an even lower level. Thus, the emergent water from line 58 may be relatively very pure indeed, such as having an oil concentration of only a few parts per million.

The filter device 100 may of any suitable type such as an activated charcoal and/or reverse osmosis type. Activated clay filters may also be used.

The provision of the hydrocyclone 10, in addition to providing a separating action, also assists in that a substantial Pressure drop will normally exist as between the inlet line 42 and the outlet 23 from the separator. This reduction in pressure, which may for example be 50%, has the effect that oil in solution in the water will tend to come out of solution and form droplets which, even if they are not separated totally in the cyclone 10, emerge from the outlet line 44, and can be more readily separated from the water component in the device 100.

The pressure reducing device 50, although preferable, may be omitted in some instances, as indicated. It is also possible to use, as the pressure reducing device, a suitable valve or, if desired, another hydrocyclone, particularly one designed to remove solids from admitted liquid. The vessel 90 may also be eliminated in some instances.

The described mixing and/or residence vessel 90 may comprise a precoalescer or coalescer, for example a cross-plate interceptor skimmer. It is also possible in some instances to facilitate operation by positioning a low shear pressure increasing device either in line 92, to act on the inlet mixture prior to entering the vessel 90, or in line 42 to act on mixture having left vessel 90 prior to entry into hydrocyclone 10. By the term "low shear pressure increasing device" is meant any pressure increasing device, such as a pump effective to increase liquid pressure without inducing substantial shear stress in the liquid.

Figure 3:
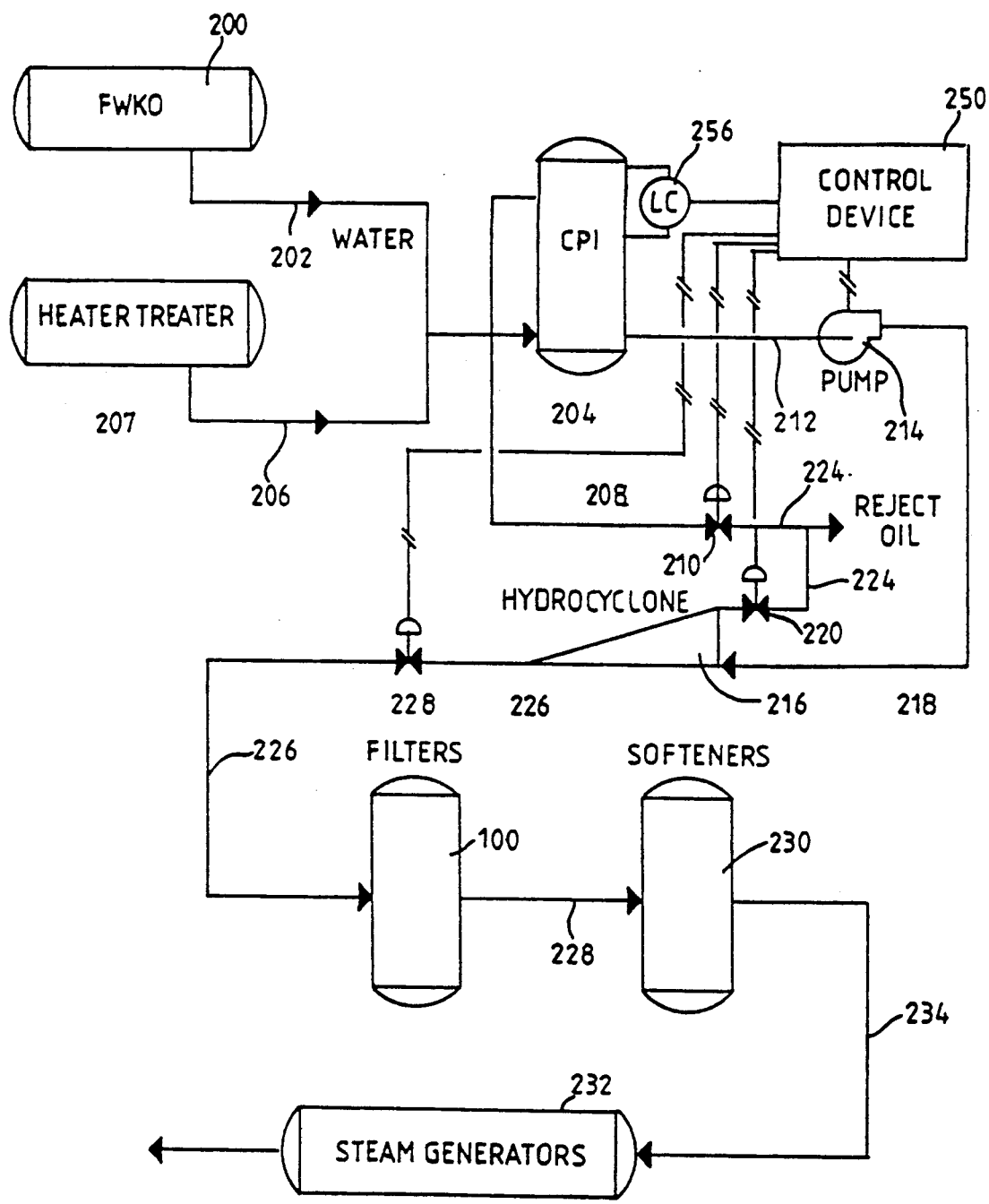
FIG. 3 is a flow diagram of a further liquid separator constructed in accordance with the invention.

FIG. 3 shows a further apparatus constructed in accordance with the invention. This is similar to the previously described apparatus, but is designed specifically for recovery of water from an oily water mixture. The oily water mixture is first passed to a free water knockout tank 200, which effects partial separation of water and oil components by settlement. The more dense water, typically containing 2000 ppm oil, is taken on a line 202 to a mixing and/or residence vessel in the form of a cross plate interceptor skimmer 204. A heater treater 207 is also provided, this providing heated water, such as water recovered from oil-water mixtures elsewhere in a processing plant. The treated water is passed, such as periodically, on a line 206 to mix with the water from tank 200 on line 202. The so mixed water is that which is passed to the skimmer 204. The skimmer has provision for take-off of reject oil on a line 208 through a suitable valve 210. Separated water, typically containing 160 ppm is taken out on a line 212 and pumped, via a pump 214, to the inlet of a hydrocyclone 216, on a line 218. Removed oil from the water entering the hydrocyclone is taken via a valve 220 on a line 222 to be taken, together with the removed oil passing from valve 210, from the apparatus, on a line 224. The water emerging from the hydrocyclone 16, typically having an oil content of 10 ppm, is passed on a line 226 via a valve 228 to a filter device 100, as previously described. Removed water is then taken on a line 228 to a suitable softener device 230 and may be then used, for example, in a steam generator 232 to which the water is applied on a line 234.

The apparatus shown in FIG. 3 is controlled, such as electronically, from a suitable control device 250 which, in addition to controlling valves 210, 220 and 228, also controls the rate of pumping of the pump 214 and is effective via a suitable level control device 256 to control the liquid level in the skimmer 204.

The provision of heater treater 207 has been found to be particularly useful in providing a supply of heated water which facilitates the action of the skimmer 204. The heater treater may, in particular, apply heated water periodically to the skimmer.

The described arrangement has been advanced merely by way of explanation and many modifications may be made thereto without departing from the spirit and scope of the invention as defined in the appended claims.

I claim:

1. A separator for separating oil and water components of a fluid mixture wherein the oil component is comprised of droplets of a less dense phase in a more dense water phase, and wherein it is desired to ultimately provide a water phase which is substantially free of oil, comprising: a hydrocyclone designed, constructed and arranged to effect separation of an oil component from a water component of an inletted fluid mixture, having a separating chamber with an inlet for inlet of the fluid mixture to be separated, an overflow outlet means for outlet of less dense components of the mixture and an underflow outlet means for outlet of a more dense component of said mixture, and a filter device coupled to receive outlet from said underflow outlet means and designed for removing any remaining less dense components of the mixture from the more dense component to provide a water phase that is substantially free of oil, with the outlet of less dense and more dense components from said overflow and underflow outlet means, respectively being arranged to follow separate flow paths so that the less dense components outletting from the overflow outlet means are not passed into said filter device for contact with the more dense component of the mixture outletting from the underflow outlet means, and outlet passage means on said filter device for passing the water component from which remaining less dense components of the mixture have been substantially removed.

2. A liquid separator as claimed in claim 1 including a pressure reducing device arranged so that the material from said underflow outlet means is passed therethrough before admission to said filter device.

3. A separator system comprising: a hydrocyclone designed, constructed and arranged to effect separation of an oil component from a water component of an inletted fluid mixture, having a separating chamber with an inlet for inlet of the fluid mixture to be separated, an overflow outlet means for outlet of a less dense component of the mixture and an underflow outlet means for outlet of a more dense component of said mixture, and a filter device coupled to receive outlet from said underflow outlet means whereby the hydrocyclone is in use effective to effect a pressure reduction in the material emerging from said underflow outlet means as compared to pressure of said mixture at said inlet, thereby being designed to facilitate any of said less dense component present in solution in said more dense component breaking out of solution to be either carried to said overflow outlet means or to emerge from the underflow outlet means with the more dense component, as droplets thereof in the more dense component, the filter device being designed to effect further separation of said droplets from the more dense component, said separator system being arranged to pass the less dense component from said overflow outlet means without being received by said filter device, and outlet passage means on said filter device for passing the water component from which remaining less dense components of the mixture have been substantially removed.

4. A liquid separator as claimed in claim 1, 2 or 3 wherein said filter device comprises one or more of the following: a reverse osmosis filter, an activated clay filter or an activated charcoal filter.

5. A liquid separator for separating oil and water components of a fluid mixture wherein the oil component is comprised of droplets of a less dense phase in a more dense water phase, and wherein it is desired to ultimately provide a water phase which is substantially free of oil, comprising: a hydrocyclone having a separating chamber with an inlet means for inlet of a liquid mixture to be separated, an overflow outlet means for outlet of less dense components of the mixture and an underflow outlet means for outlet of a more dense component of said mixture, and filter device means coupled to receive outlet from said underflow outlet means for removing any remaining less dense components of the mixture from the more dense component to provide a water phase that is substantially free of oil, and further including a residence vessel through which the liquid mixture to be separated is passed, prior to admission to the hydrocyclone, for coalescing in part at least one of the components of the mixture upstream of the hydrocyclone inlet means.

6. A liquid separator as claimed in claim 5 wherein said residence vessel includes means for inlet into the liquid mixture therein of heated fluid.

7. A method for separating oil and water components of a liquid mixture one from the other by use of a hydrocyclone to which the mixture is admitted, the hydrocyclone having overflow and underflow outlets and being operated whereby a less dense oil component of the mixture emerges from the underflow outlet of the hydrocyclone in the form of droplets in a more dense water component of the mixture, the material emerging from the underflow outlet being admitted to a filter device to effect further separation thereof; and passing a less dense component of the mixture from the overflow outlet through a flowpath that does not admit a less dense component emerging from the overflow outlet to the filter device.

8. A method as claimed in claim 7 wherein said filter device comprises one or more of the following: an activated charcoal filter, a reverse osmosis filter, or an activated clay filter.

9. A method as claimed in claim 7 wherein said material emerging from the hydrocyclone underflow is passed through a pressure reducing device before entering said filter device.

10. A method for separating oil and water components of a liquid mixture one from the other by use of a hydrocyclone to which the mixture is admitted, the hydrocyclone being operated whereby a less dense oil component of the mixture emerges from an outlet of the hydrocyclone in the form of droplets in a more dense water component of the mixture, the material emerging from the outlet being admitted to a filter device to effect further separation thereof, wherein said mixture is passed through a residence vessel before admission to said hydrocyclone, and coalescing, in part, at least one component of the mixture in the residence vessel.

11. A method as claimed in claim 10 wherein said residence vessel comprises a mixing device and further including mixing the mixture therein to aid in coalescence.

12. A method as claimed in claim 11 and further comprising introducing into the mixture in said residence vessel, chemicals to coalesce the mixture.

13. A method as claimed in claim 10 and further comprising inletting into the residence vessel heated liquid or other heated fluid, to mix with the mixture therein.

14. A method for separating oil and water components of an oil and water mixture wherein the oil component is comprised of droplets of a less dense phase and the water component represents a more dense phase of the mixture, and where it is desired to ultimately provide a water phase which is substantially free of oil, comprising the steps of:

passing the mixture to a separation vessel to effect partial gravity separation of the mixture into at least an oil phase and an oily water phase;

passing the oily water phase from the separation vessel to further separation processing including an hydrocyclone downstream of said separation vessel, said hydrocyclone having outputs of a less dense oil component and a mire dense water component with droplets of oil therein to form an oily water outlet stream;

passing the oily water outlet stream from the hydrocyclone to a filter device to further remove oil droplets therefrom and thereby provide a water phase that is substantially free of oil.

15. The method of claim 14 and further including passing the oily water phase from the separation vessel to a residence vessel for at least partially coalescing droplets of the less dense phase of the mixture prior to passing the mixture to said hydrocyclone.

16. The method of claim 15 and further including passing heated fluids to the said residence vessel for aiding in the coalescing of droplets of the less dense phase of the mixture.

17. The method of claim 14 and further including reducing the pressure downstream of the underflow outlet of the hydrocyclone to reduce pressure on the oily water outlet stream and thereby aid in removing any remainder of the less dense phase out of the more dense water phase.

* * * * *